(12) United States Patent
Priness et al.

(10) Patent No.: US 10,013,462 B2
(45) Date of Patent: Jul. 3, 2018

(54) VIRTUAL TILES FOR SERVICE CONTENT RECOMMENDATION

(71) Applicant: Microsoft Technology Licensing, LLC, Redmond, WA (US)

(72) Inventors: Ido Priness, Herzliya (IL); Dikla Dotan-Cohen, Herzliya (IL); Boaz Sapir, Givatayim (IL); Daniel Avigdor, Barkan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 14/811,289

(22) Filed: Jul. 28, 2015

(65) Prior Publication Data

US 2017/0031996 A1 Feb. 2, 2017

(51) Int. Cl.
*G06F 17/30* (2006.01)
*G06Q 30/06* (2012.01)

(52) U.S. Cl.
CPC .... *G06F 17/30528* (2013.01); *G06F 17/3087* (2013.01); *G06F 17/30554* (2013.01); *G06F 17/30867* (2013.01); *G06Q 30/06* (2013.01)

(58) Field of Classification Search
CPC .......... G06F 17/3087; G06F 17/30554; G06F 17/30867; G06F 17/30528
USPC ........................................ 707/736, 737, 748
See application file for complete search history.

(56) References Cited

U.S. PATENT DOCUMENTS

| | | | |
|---|---|---|---|
| 8,200,247 B1 | 6/2012 | Starenky et al. | |
| 8,519,860 B2 | 8/2013 | Johnson et al. | |
| 8,549,105 B1 | 10/2013 | Nourse et al. | |

(Continued)

FOREIGN PATENT DOCUMENTS

| | | |
|---|---|---|
| WO | 2010126973 A1 | 11/2010 |
| WO | 2013135948 A1 | 9/2013 |
| WO | 2013184384 A2 | 12/2013 |

OTHER PUBLICATIONS

"International Search Report and Written Opinion Issued in PCT Application No. PCT/US2016/043452", dated Sep. 22, 2016, 12 Pages.

(Continued)

*Primary Examiner* — Phong H Nguyen
(74) *Attorney, Agent, or Firm* — Shook Hardy & Bacon L.L.P.

(57) ABSTRACT

In various implementations, virtual tiles are constructed where each virtual tile includes geographic tiles having one or more shared semantic characteristics. Usage records of service content items are received, which are generated from sensor data from a plurality of mobile devices within a geographic region that includes the geographic tiles. Each usage record identifies a service content item, and a usage location corresponding to a user interaction with the service content item. Statistical correlations are calculated between service content items and a virtual tile based on an aggregation of the usage records that have a usage location within at least one of the geographic tiles of the virtual tile. Recommendations of one or more service content items are provided to a user based on the calculated statistical correlations. In some cases, one or more service content items are recommended based on being representative of a particular virtual tile.

20 Claims, 6 Drawing Sheets

(56) References Cited

U.S. PATENT DOCUMENTS

| | | | | |
|---|---|---|---|---|
| 8,571,581 B2* | 10/2013 | Lee | ................. | H04W 4/02 |
| | | | | 455/456.3 |
| 8,688,726 B2 | 4/2014 | Mahajan et al. | | |
| 8,711,181 B1 | 4/2014 | Nourse et al. | | |
| 8,849,308 B2* | 9/2014 | Marti | ................. | H04W 4/043 |
| | | | | 455/456.2 |
| 8,922,575 B2 | 12/2014 | Garside et al. | | |
| 2008/0248809 A1* | 10/2008 | Gower | ................. | H04W 4/02 |
| | | | | 455/456.1 |
| 2011/0307478 A1 | 12/2011 | Pinckney et al. | | |
| 2012/0042036 A1 | 2/2012 | Lau et al. | | |
| 2012/0122476 A1* | 5/2012 | Lee | ................. | H04W 4/02 |
| | | | | 455/456.1 |
| 2012/0173339 A1 | 7/2012 | Flynt et al. | | |
| 2013/0137464 A1* | 5/2013 | Kramer | ................. | G06Q 30/02 |
| | | | | 455/456.3 |
| 2013/0325856 A1 | 12/2013 | Matamala et al. | | |
| 2013/0339345 A1 | 12/2013 | Matamala et al. | | |
| 2014/0171129 A1 | 6/2014 | Benzatti et al. | | |
| 2014/0194146 A1 | 7/2014 | Yarvis | | |
| 2014/0201675 A1* | 7/2014 | Joo | ................. | G06F 3/0481 |
| | | | | 715/784 |
| 2014/0358836 A1 | 12/2014 | Moore et al. | | |
| 2015/0066648 A1* | 3/2015 | Kane, Jr. | ................. | G06N 5/02 |
| | | | | 705/14.58 |
| 2015/0254720 A1* | 9/2015 | Newberg | ................. | G06Q 30/0261 |
| | | | | 705/14.63 |
| 2015/0348076 A1* | 12/2015 | Mondragon | ................. | G06F 17/30303 |
| | | | | 705/7.34 |

OTHER PUBLICATIONS

Deveaud, et al., "SmartVenues: Recommending Popular and Personalised Venues in a City", In Proceedings of the 23rd ACM International Conference on Conference on Information and Knowledge Management, Nov. 13, 2014, 3 pages.

Wong, et al., "Adaptive Context Aware Attentive Interaction in Large Tiled Display", In Proceedings of the 4th International Conference on Universal access in Human-Computer Interaction: Ambient Interaction, Jul. 22, 2007, 2 pages.

Etherington, Darrell., "Apple Delivers Location-Based App Suggestions on Your Lock Screen in iOS 8", Published on: Jun. 3, 2014 Available at: http://techcrunch.com/2014/06/03/apple-delivers-location-based-app-suggestions-on-your-lock-screen-in-ios-8/.

Lawler, Ryan., "Location-Based Mobile App Alike Recommends Nearby Venues That Are Just Like Your Favorites", Published on: Oct. 9, 2012 Available at: http://techcrunch.com/2012/10/09/alike/.

Bao, et al., "Location-based and Preference-Aware Recommendation Using Sparse Geo-Social Networking Data", In Proceedings of the 20th International Conference on Advances in Geographic Information Systems, Nov. 6, 2012, 10 pages.

"Second Written Opinion Issued in PCT Application No. PCT/US2016/043452", dated Jul. 7, 2017, 12 Pages.

"International Preliminary Report on Patentability Issued in PCT Application No. PCT/US2016/043452", dated Oct. 18, 2017, 12 Pages.

* cited by examiner

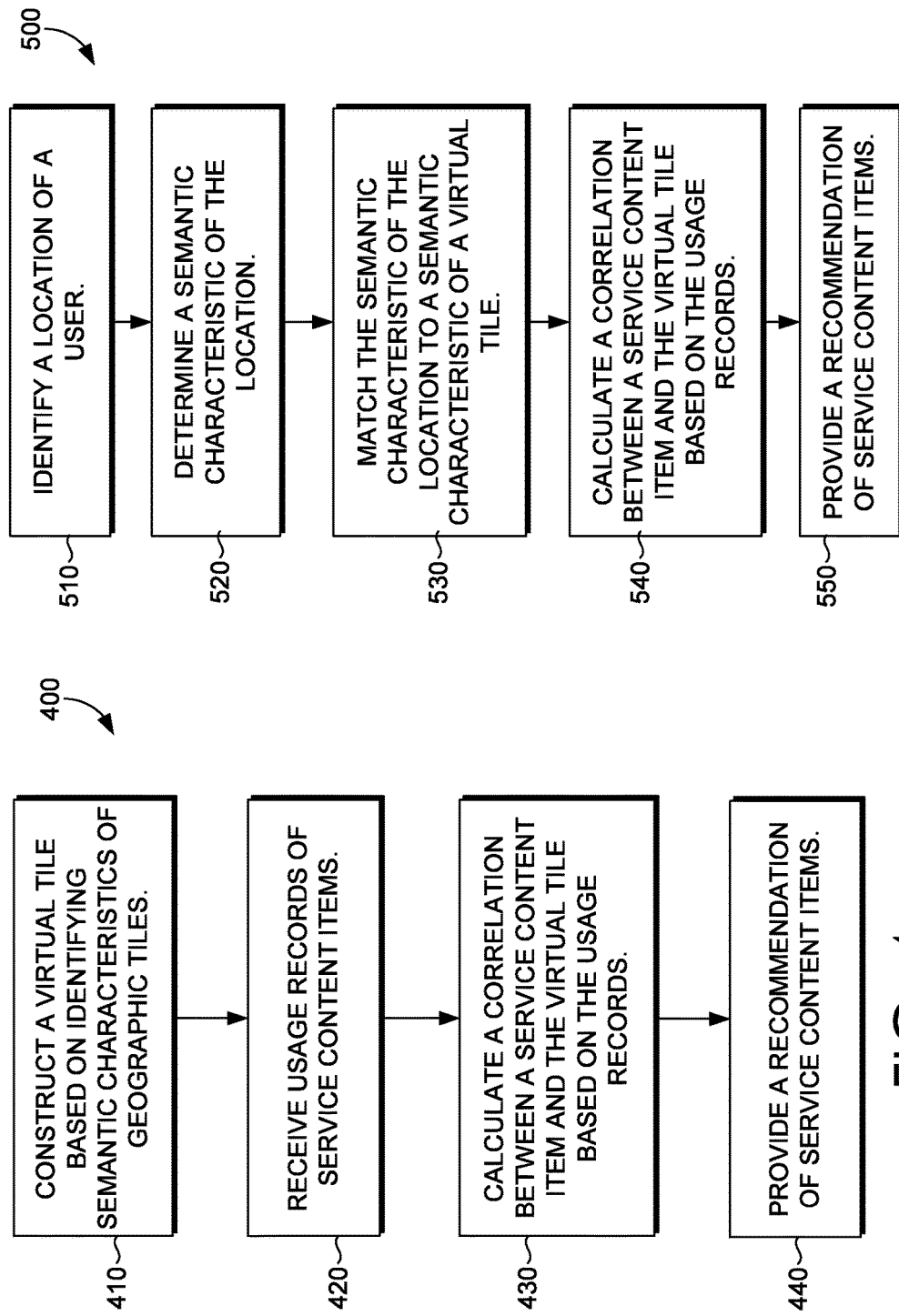

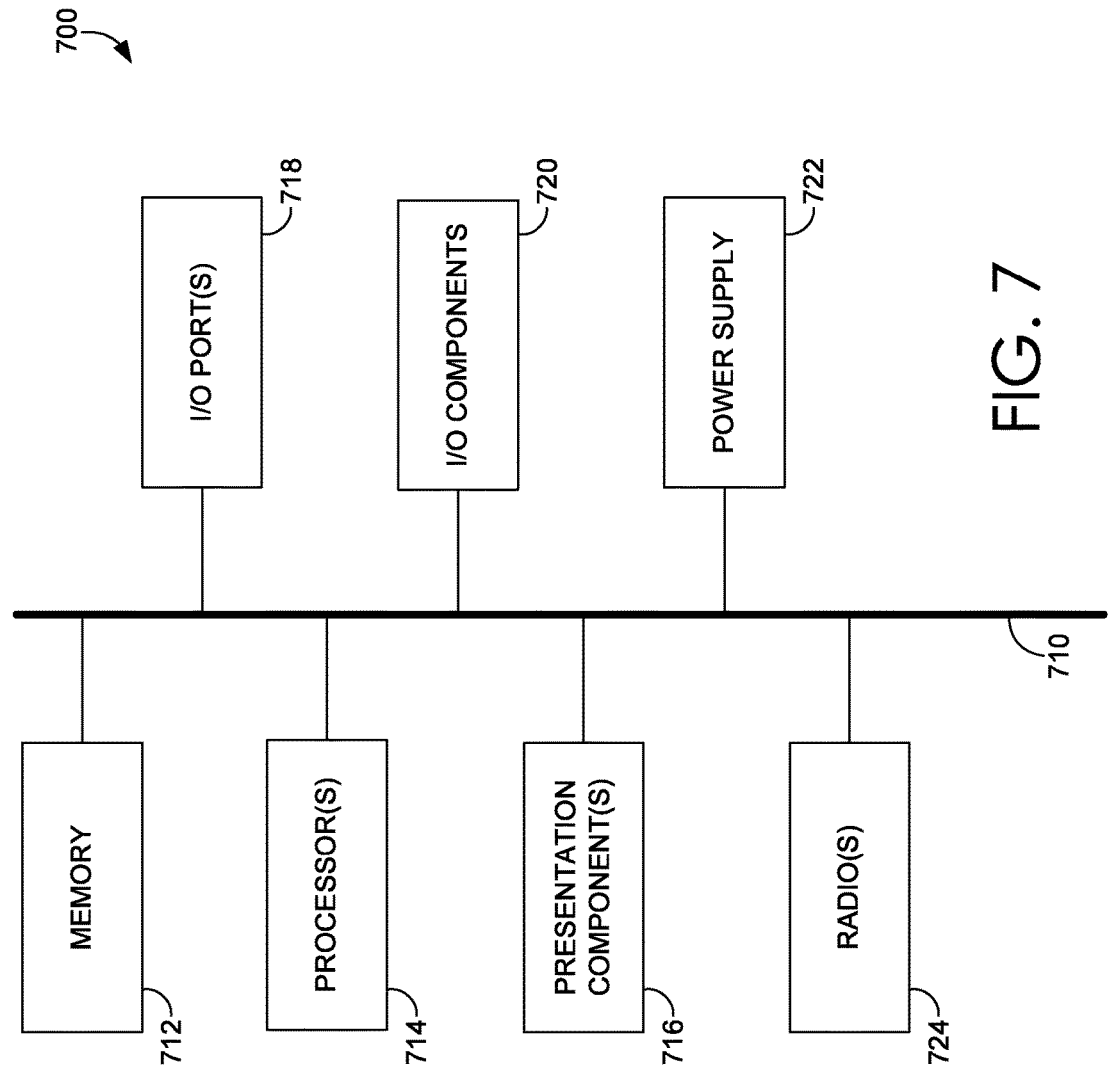

VIRTUAL TILES FOR SERVICE CONTENT RECOMMENDATION

BACKGROUND

People are ever more reliant on computing devices, such as mobile devices, for their day-to-day activities. Various service content items are available for users via these computing devices. As one example of such service content items, mobile devices can run software applications, or apps, which are designed to help users perform tasks. Other examples include songs, movies, images, documents, books, content cards, and the like. With the ever increasing amount of service content items available for users from content providers via platforms such as Windows Store by Microsoft®, Microsoft Cortana, and the like, it can be difficult to provide the users with those that are most useful. Thus, users may consume extensive computing resources of their devices and of content providers searching for, downloading, and/or evaluating service content items attempting to discover those that are useful or desirable.

When sufficient service content items are recommended to users, their consumption of the computing resources is reduced. However, insufficient recommendations can have the opposite effect on resource consumption. Recommendations may be made using crowd-sourced data from users. However, often times recommendation systems lack the data points required to reliably provide sufficient recommendations to users. In these cases, the systems may refrain from providing recommendations as an alternative to providing insufficient recommendations.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects of the present disclosure relate to using virtual tiles for recommending service content items to users. In accordance with implementations of the present disclosure, usage locations corresponding to user interactions with service content items are tracked using sensor data provided by sensors, such as GPS receivers, on a plurality of user devices, such as mobile devices. In some respects, the service content items may be apps, and the user interactions may correspond to launches of the apps. In other respects, the service content items may be websites, and the user interactions may correspond to website visits. However, the present disclosure is not limited to apps or websites and may other examples of service content items are described below. The usage locations of the service content items may be included in usage records that each identify a service content item and can be aggregated for the purpose of recommending service content items to users.

In further respects, virtual tiles are constructed from geographic tiles that have one or more shared semantic characteristics, where each geographic tile represents a designated geographic area. The one or more shared semantic characteristics are of the geographic areas of the geographic tiles and serve to effectively link distinct geographic areas thereby enriching the data points available for determining recommendations of service content items. In some cases, a shared semantic characteristic of a geographic area may be identified based on determining a particular venue and/or category of a venue (e.g., a particular venue chain-store or a utility category, such as a coffee shop or park) within the geographic area.

Additional aspects of the present disclosure relate to calculating statistical correlations between service content items and virtual tiles based on an aggregation of the usage records for recommending service content items to users. The aggregations for a virtual tile are based on identifying usage records that have usage locations of service content items that are within the geographic tiles of the virtual tile. By aggregating usage locations across geographic tiles that have shared semantic characteristics, strong statistical correlations between geographic areas and service content items can be identified, even in cases where no single geographic area has a sufficient number of usage records or other data points to identify a strong statistical correlation for the geographic area.

In further respects, the calculated statistical correlations can be used to recommend service content items to users. As one particular example, a user may be recommended a service content item based on matching one or more semantic characteristics of a particular location of a user to one or more semantic characteristics of a virtual tile that shows a sufficient statistical correlation to the service content item. Thus, in some embodiments, a service content item may be recommended to a user for a particular location, even where the system has no usage records for service content items proximate to the location. As another example, a user may be recommended a service content item based on matching one or more semantic characteristics of the user to the one or more semantic characteristics of the virtual tile independent of a particular location of the user.

In additional aspects of the present disclosure, the statistical correlations of the virtual tiles can be used to infer semantic characteristics of user locations. As an example, one or more semantic characteristics of a virtual tile can be inferred for a particular location of a user based on the user performing a user interaction with a service content item that has a sufficient statistical correlation with the virtual tile (e.g., a user interacting with a service content item associated with the virtual tile indicates that the location of the user may share a semantic characteristic of the virtual tile). In doing so, the inferred semantic characteristics for the particular location can be used as a factor in inferring whether the user has visited a particular venue. For example, the user is inferred to more likely have visited a particular venue within a category where a shared semantic characteristic of the virtual tile corresponds to the presence of a category of venue. Service content items may be recommended to the user based on determining that the user is at the particular venue. These and other concepts are contemplated as being within the scope of the present disclosure.

BRIEF DESCRIPTION OF THE DRAWINGS

The present invention is described in detail below with reference to the attached drawing figures, wherein:

FIG. 4 is a flow diagram showing a method for recommending service content items to users based on virtual tiles in accordance with implementations of the present disclosure;

FIG. 5 is a flow diagram showing a method for recommending service content items to users based on virtual tiles in accordance with implementations of the present disclosure;

FIG. 7 is a block diagram of an exemplary computing environment suitable for use in implementations of the present disclosure.

DETAILED DESCRIPTION

Figure 1:
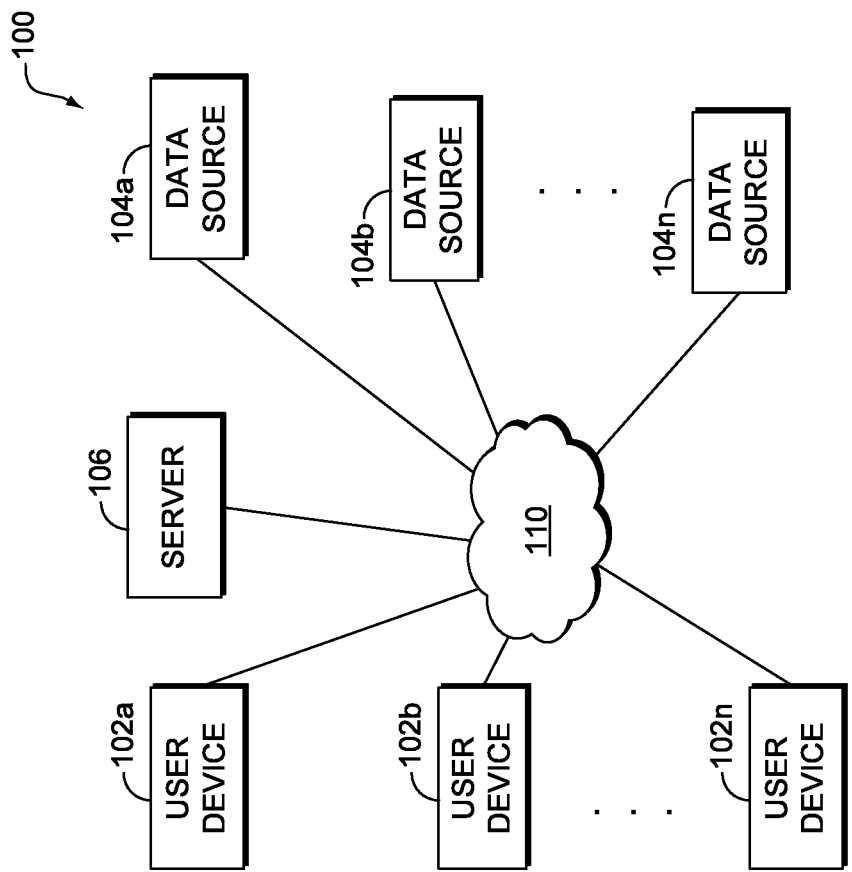
FIG. 1 is a block diagram showing an exemplary operating environment for using virtual tiles to recommend service content items to users in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to using virtual tiles for recommending service content items to users. In accordance with implementations of the present disclosure, usage locations corresponding to user interactions with service content items are tracked using sensor data provided by sensors, such as GPS receivers, on a plurality of user devices, such as mobile devices. The term "service content items" is used broadly herein and generally refers to any service(s) and/or content that a user opens, launches, receives, downloads, plays, accesses, or otherwise makes use of with a computing device. Without limitation, examples of a service content item might include one or more of audio, video, image, or other media content, including streaming content, application and/or app including a function carried out by or a service provided via the application or app including cloud-based services, digital book or e-book, content card, document, or website. In some respects, the service content items may be apps, and the user interactions may correspond to launches of the apps. The usage locations of the service content items may be included in usage records that each identify a service content item and can be aggregated for the purpose of recommending service content items to users.

In further respects, virtual tiles are constructed from geographic tiles that have one or more shared semantic characteristics, where each geographic tile represents a designated geographic area. The one or more shared semantic characteristics are of the geographic areas of the geographic tiles and serve to effectively link distinct geographic areas thereby enriching the data points available for determining recommendations of service content items. In some cases, a shared semantic characteristic of a geographic area may be identified based on determining a particular venue and/or category of a venue (e.g., a particular venue chain or a utility category, such as a coffee shop) within the geographic area.

Additional aspects of the present disclosure relate to calculating statistical correlations between service content items and virtual tiles based on an aggregation of the usage records for recommending service content items to users. The aggregations for a virtual tile are based on identifying usage records that have usage locations of service content items that are within the geographic tiles of the virtual tile. By aggregating usage locations across geographic tiles that have shared semantic characteristics, strong statistical correlations between geographic areas and service content items can be identified, even in cases where no single geographic area has a sufficient number of usage records or other data points to identify a strong statistical correlation for the geographic area.

In further respects, the calculated statistical correlations can be used to recommend service content items to users. As one particular example, a user may be recommended a service content item based on matching one or more semantic characteristics of a particular location of a user to one or more semantic characteristics of a virtual tile that shows a sufficient statistical correlation to the service content item. Thus, in some embodiments, a service content item may be recommended to a user for a particular location, even where the system has no usage records for service content items proximate to the location. Additionally, using this approach, the service content item can be recommended to the user even where the system has little to no information about the particular user, other than the particular location. As another example, a user may be recommended a service content item based on matching one or more semantic characteristics of the user to the one or more semantic characteristics of the virtual tile independent of a particular location of the user.

In additional aspects of the present disclosure, the statistical correlations of the virtual tiles can be used to infer semantic characteristics of user locations. As an example, one or more semantic characteristics of a virtual tile can be inferred for a particular location of a user based on the user performing a user interaction with a service content item that has a sufficient statistical correlation with the virtual tile. In doing so, the inferred semantic characteristics for the particular location can be used as a factor in inferring whether the user has visited a particular venue. For example, the user is inferred to more likely have visited a particular venue within a category where a shared semantic characteristic of the virtual tile corresponds to the presence of a category of venue. Service content items may be recommended to the user based on determining that the user is at the particular venue.

Turning now to FIG. 1, a block diagram is provided showing an example operating environment 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that operating environment 100 shown in FIG. 1 is an example of one suitable operating environment. Each of the components shown in FIG. 1 may be implemented via any type of computing device, such as computing device 700, described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a through 102n can be client devices on the client-side of operating environment 100, while server 106 can be on the server-side of operating environment 100. Server 106 can comprise server-side software designed to work in conjunction with client-side software on user devices 102a through 102n so as to implement any combination of the features and functionalities discussed in the present disclosure. This division of operating environment 100 is provided to illustrate one example of a suitable environment, and there is no requirement for each implementation that any combination of server 106 and user devices 102a through 102n remain as separate entities.

User devices 102a through 102n may comprise any type of computing device capable of being operated by a user. For example, in one implementation, user devices 102a through 102n may be the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one implementation, one or more data sources 104a through 104n provide (or make available for accessing) user data to data collection component 215 of FIG. 2.) Data sources 104a and 104b through 104n may be discrete from user devices 102a through 102n and server 106 or may be incorporated and/or integrated into at least one of those components. In one implementation, one or more of data sources 104a though 104n comprises one or more sensors, which may be integrated into or associated with one or more of the user device(s) 102a through 102n or server 106. Examples of sensed user data made available by data sources 104a though 104n are described further in connection to data collection component 215 of FIG. 2.

Figure 2:
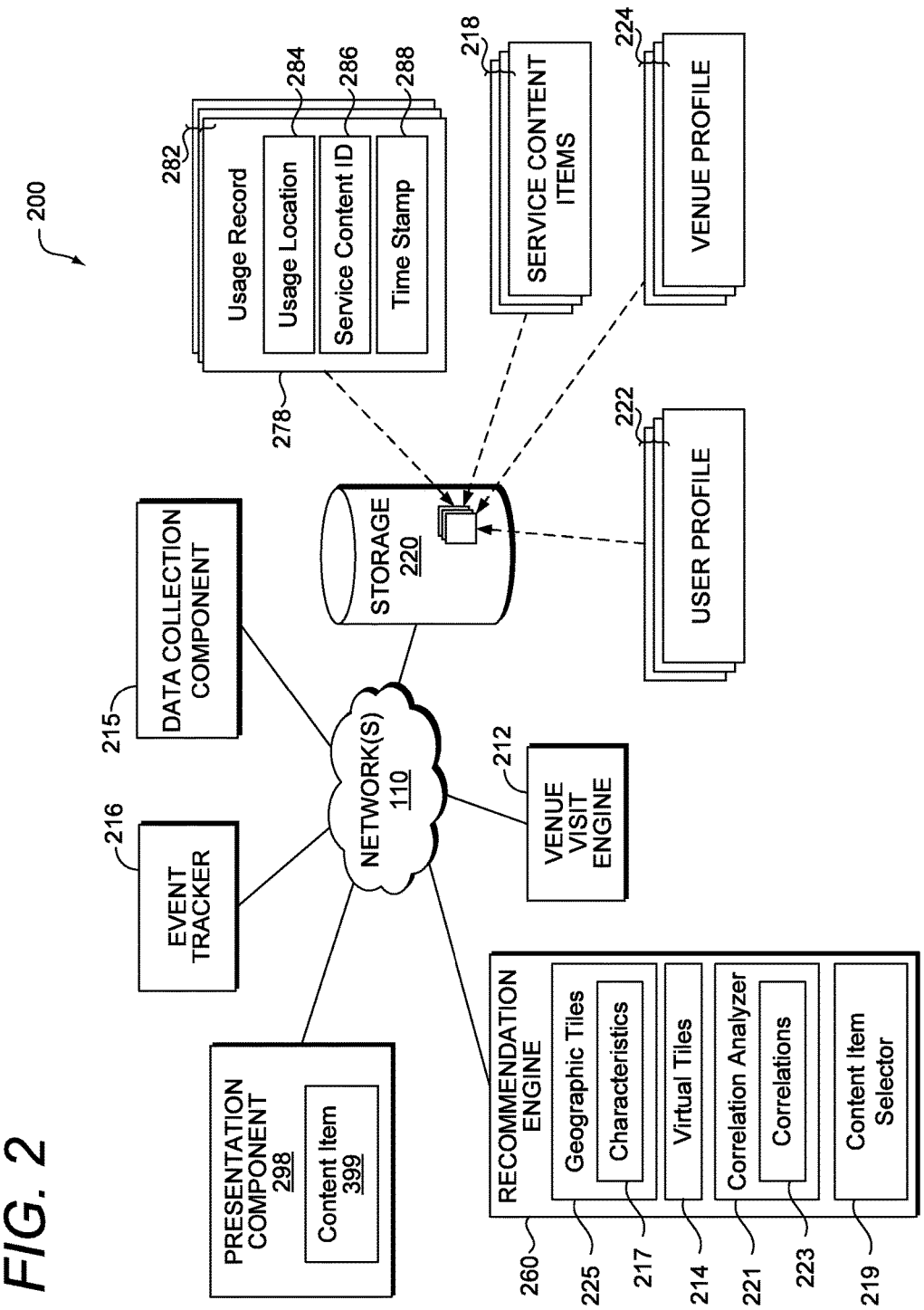
FIG. 2 is a block diagram showing an exemplary system for using virtual tiles to recommend service content items to users in accordance with implementations of the present disclosure.

Operating environment 100 can be utilized in conjunction with the components of the exemplary computing system architecture depicted in FIG. 2 that is suitable for implementing embodiments of the invention and is generally designated as system 200. System 200 represents only one exemplary computing system architecture suitable for implementing aspects of the invention. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. Among other components not shown, system 200 is generally comprised of components for inferring correlations between virtual tiles (e.g., virtual tiles 214) and service content items (e.g., service content items 218), based on usage records (e.g., usage records 282) of the service content items. System 200 includes such components as data collection component 215, storage 220, recommendation engine 260, venue visit engine 212, and presentation component 298, all of which are communicatively coupled via network 110.

In some implementations, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some implementations these components of system 200 may be distributed across a network, including one or more servers (such as server 106) and client devices (such as user device 102a), in the cloud, or may reside on a user device such as user device 102a. As with operating environment 100, some of the components described herein may be embodied as a set of compiled computer instructions, computer functions, program modules, computer software services, or an arrangement of processes carried out on one or more computer systems, such as computing device 700 described in connection to FIG. 7.

These components, functions performed by these components, or services carried out by these components may be implemented at appropriate abstraction layer(s) such as the operating system layer, application layer, hardware layer, etc., of the computing system(s). Alternatively, or in addition, the functionality of these components and/or the implementations of the invention described herein can be performed, at least in part, by one or more hardware logic components. Exemplary types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in exemplary system 200, it is contemplated that in some implementations functionality of these components can be shared or distributed across other components.

In general, storage 220 is configured to store computer instructions (e.g., software program instructions, routines, or services), data, and/or models used in implementations of the embodiments described herein. In some implementations, storage 220 stores information or data received via the various components of system 200 and provides the various components of system 200 with access to that information or data. For example, storage 220 may store such information or data as user, venue, and interpretive data described with respect to data collection component 215, interaction data, inferential data, semantic information, semantic characteristics, interaction datasets, crowd-sourced datasets, individual-sourced datasets, user routine models, routine-related inferences, routine-related profiles, user profiles (e.g., user profiles 222), venue profiles (e.g., venue profiles 224), service content items (e.g., service content items 218), usage records (e.g., usage records 282), virtual tiles (e.g., virtual tiles 214), and geographic tiles (e.g., geographic tiles 225). In implementations, storage 220 comprises a data store (or computer data memory). Although depicted as a single component, storage 220 may be embodied as one or more data stores or may be in the cloud. Further, the information in storage 220 may be distributed in any suitable manner across data store for storage.

Data collection component 215 is generally responsible for acquiring, accessing, or receiving (and in some cases also identifying) user data, venue data, and interpretive data (which may occur in real-time, periodically, and/or as needed) from one or more data sources, such as data sources 104a through 104n of FIG. 1. User data corresponds to data acquired in association with one or more users. As used herein, a user can correspond to a user profile, such as one of user profiles 222, which optionally may be associated with a user account comprising one or more of a username, a password, a user device (e.g., a media access control address), an Internet Protocol (IP) address, a universally unique identifier (UUID), and/or other user identifiers. In some cases, user data may not be directly associated with a user account, but may be associated with another user account that is known or designated to correspond to the same user. For example, one of user profiles 222 may be linked to one or more other user accounts, which may be in another system or other systems. As examples, the same user could have a Microsoft® account, an Amazon.com® account, a Facebook® account, a PayPal® account, a Google® Account, a Twitter® account, a bank account, an eBay® account, and an XBOX Live® account, each of which may be associated with user data of the user, and semantic information may be extracted therefrom.

Venue data corresponds to data collected in association with one or more venues. A "venue" may refer to a physical location that people can conduct certain activities at in person. Examples of a venue include, but are not limited to a particular: store, restaurant, theater, sport arena, factory, and office building. As used herein, a venue can correspond to a venue profile, such as one of venue profiles 224, which may be associated with a corresponding venue identifier (ID) and optionally various semantic characteristics of the venue including a name of the venue, a category of the venue, a location or region of the venue, and the like.

Interpretive data corresponds to data utilized to supplement the interpretation of information in system 200. In this regard, any of the various components in system 200 can use the interpretive data to support inferences based on the information available to system 200, such as semantic characteristics and interaction data. Interpretive data can be used by any of the various components of system 200 to provide context to the information to support the inferences made in system 200. As an example, interaction data (e.g., user data) could indicate that a user was at a location, whereas interpretative data can comprise weather information utilized to infer that the user was not at a baseball stadium at the location due to a snowstorm. The types of inferences are applicable throughout the present application.

The data acquired by data collection component 215, including user data, venue data, and interpretative data, can be collected by data collection component 215 from a variety of sources in which the data may be available in a variety of formats. Examples of user or venue data include data derived from one or more sensors which may correspond to any of data sources 104a through 104n of FIG. 1. As used herein, a sensor may include a function, routine, component, or combination thereof for sensing, detecting, or otherwise obtaining information such as user data or venue from data, and may be embodied as hardware, software, or both. By way of example and not limitation, the user or venue data may include data that is sensed or determined from one or more sensors (referred to herein as "sensor data"), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with communication events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as a Microsoft account, Amazon.com, eBay, PayPal, or Xbox Live), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

In some respects, at least some of the data may be provided as input signals to the various components of system 200. An input signal can correspond to a feed of data from a corresponding source or sensor, such as any of the various sources or sensors described above. A user signal may refer to an input signal that comprises a feed of user or venue data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Similarly, a venue signal may refer to a feed of venue data from a corresponding data source. For example, a venue signal could be from a thermometer, a Rich Site Summary (RSS) document, a Twitter user, a barometer, a venue website, or other data sources.

In some aspects of the present disclosure, the user data includes interaction data, which may be received from a plurality of user devices (such as user devices 102a through 102n of FIG. 1) associated with a user or in some instances, associated with multiple users. In this way, user activity of a particular user from multiple user devices used by the user (e.g. the user's mobile phone, laptop, tablet, etc.), may be received as interaction data. Interaction data may be received, acquired, or accessed, and optionally accumulated, reformatted and/or combined, by data collection component 215 and stored in one or more data stores such as storage 220. For example, at least some interaction data may be stored in or associated with one of user profiles 222, as described herein. The one or more data stores may thus be made available to recommendation engine 260, event tracker 216, venue visit engine 212, and presentation component 298.

In some implementations, data collection component 215 is configured to accumulate interaction data reflecting user activity detected by one or more sensors for an individual user ("individual-sourced interaction data"). In some implementations, data collection component 215 is configured to accumulate interaction data associated with user-source interactions for a plurality of users ("crowd-sourced interaction data"). Any personally identifying data (i.e., interaction data that specifically identifies particular users) may either not be uploaded from the one or more data sources with interaction data, may not be permanently stored, and/or may not be made available to recommendation engine 260, event tracker 216, venue visit engine 212, and/or presentation component 298. At least some of the interaction data may be processed to generate usage records 282, described in further detail below.

Interaction data may be received from a variety of sources where the data may be available in a variety of formats. For example, in some implementations, user data accumulated by data collection component 215 is received via one or more sensors associated with user devices (such as user device 102a and/or other devices associated with the user), servers (such as server 106), and/or other computing devices.

The user data, venue data, and interpretive data may be continuously collected over time by a large variety of possible data sources and/or data systems. It is intended that the collection and accumulation of user data and venue data embody robust privacy and data protection for individuals, businesses, and public-sector organizations. In this respect, users, and, in appropriate cases venues, are given control over many aspects related to associated data, including the ability to opt in or opt out of data collection and/or any of the various tracking or analysis features described herein. Furthermore, safeguards are to be implemented to protect sensitive data from access by other parties, including other users, without express consent of the user or account administrator. Additionally, any data that is collected is intended to be made anonymous, whenever possible.

In addition to acquiring the data from the data sources, data collection component 215 can extract semantic information such as explicit and/or inferred semantic characteristics of users, geographic tiles, and/or venues from any combination of user data, venue data, or other data that may be included in the acquired data. Extracted semantic characteristics of users may be stored in association with one or more user profiles, such as user profiles 222. Further, extracted semantic characteristics of venues, may be stored in association with one or more venue profiles, such as venue profiles 224. Extracted semantic characteristics of geographic tiles may be stored in association with one or more geographic tile profiles of geographic tiles 225. In implementations where each geographic tiles are formed from venues, the semantic characteristics of the venues may optionally be utilized for the geographic tiles.

Explicit semantic characteristics correspond to explicit information, which may be explicit from a user, or explicit from a data source (e.g., a web page, document, file, yellow pages, maps, indexes, etc.) from which the information is extracted. As an example, explicit information can be extracted from data recording input by a user of likes and dislikes into a user profile associated with one of user profiles 222. As another example, the data could record a like from a "like button" on a social media site, which is provided to system 200. As another example, the explicit information could comprise a venue name and/or category extracted from yellow pages.

Deeper understandings of users, venues, and geographic tiles are available to system 200 by extracting inferred semantic characteristics. Inferred semantic characteristics can be discovered by the system by making inferences from any of the information available to system 200. This includes any combination of the user and venue data, as well as previously extracted explicit and/or inferred semantic characteristics of one or more users (e.g., the user), venues, and/or geographic tiles. In some implementations, inferred semantic characteristics can be updated over time as additional information is available for inferences. For example, the additional information may be used to determine that one or more inferred semantic characteristics no longer apply to one or more users, venues, and/or geographic tiles. This may be, for example, a result of changes in nature of the user, venue, and/or geographic tile and/or a result of system 200 having a better understanding of users, venues, and/or geographic tiles or the world based on the additional information. In some cases, inferred semantic characteristics might additionally or instead be updated over time based on the information available to system 200 becoming stale or otherwise unreliable. Where inferred semantic characteristics change, any information based on the semantic characteristics could be updated.

In some cases, event tracker 216 can be utilized to assist in generating inferences by any of the various components in system 200. Event tracker 216 is configured to identify and track events and optionally routines of one or more users, venues, and/or geographic tiles from interaction data, such as user and venue data. A "routine" (modeled routine) may be defined in terms of one or more recurring events that make up the routine. An "event" (modeled event) can correspond to one or more defined actions, behaviors, and/or activities that correspond to a user, venue, or geographic tiles, and are detectable from user and/or venue data and tracked by system 200.

Examples of events are the user eating at a restaurant, the user eating at a particular restaurant, the user being in a particular geographic region or area, the user launching a service content item, the user interacting with a service content item, the user listening to a song or video, the user downloading a service content item, the user being at a geographic location, the user attending a meeting, reception of a sensor reading associated with the user, the user going to the gym, and the user being at work, amongst many more possibilities. A user may visit a venue, such as a particular venue, which may be identified and selected by venue visit engine 212. One or more of the events may be inferred from the venue visit. It is noted that one to all events can be associated with a routine. However, in many cases, an event may not be associated with a routine.

Event tracker 216 can store any of the various data employed in tracking routines and/or events of users, venues, and/or geographic tiles as user tracking data, venue tracking data, and geographic tiles tracking data respectively (each can include venue visits, visitation patterns, and/or other information inferred or discovered by system 200). Over time, event tracker 216 may update the tracking data as data is periodically analyzed and new events and routines are discovered, modified, or disassociated with users, venues, and/or geographic tiles. One or more semantic characteristics of users, venues, and geographic tiles can be inferred the tracked data. Thus, it will be appreciated that semantic characteristics, such as cuisine preferences, movie watching patterns, and the like may also be updated and discovered for users based on the data. In some cases, the event tracking data includes records that may store or otherwise indicate any of the various data associated with a routine and/or event, such as events of the routine and/or values associated with tracked variables of those events. One such example includes usage records 282, described in further detail below.

Tracked variables are event variables that are assigned and/or recorded by event tracker 216 with respect to a corresponding detected instance of an event. Values corresponding to the tracked variables may be stored in association with a user, venue, and/or geographic tile in the event tracking data. Tracked variables can correspond to any of a variety of user data or venue data, examples of which have been described above and include sensor data or readings, which may be sensed by one or more sensors (such as information associated with a user device regarding location, position, motion/orientation, user-access/touch, connecting/disconnecting a charger, user activity on the user device, or other information that may be sensed by one or more sensors, such as sensors found on a mobile device) GPS coordinate samples, and many more.

It will be appreciated that values of tracked variables may be associated with one or more events and/or routines and need not be event or routine specific. An example of a tracked variable is a time stamp corresponding to a respective instance of the event, such as a venue visit that may be identified by venue visit engine 212, a usage or user interaction with a specific service content item, a usage location, or any of the various examples of events described herein (e.g., with respect to service content items). The time stamp can indicate the relative order or sequence of an instance of an event with respect to other instances of the event, and optionally instances of one or more other events of a corresponding routine.

As further examples of tracked variables, an event may comprise a user arriving at a store. One tracked variable may correspond to an arrival location or venue, such as an arrival location name or venue name. In detecting the event, event tracker 216 may infer the arrival as being satisfied based on user data comprising GPS data on the user's phone (e.g., user device 102a of FIG. 1), where the arrival location name or venue name is categorized as a store and stored based on interpretive data that includes map data used to associate coordinates from the user's phone with a corresponding location or venue name. Thus, for one event instance, the name may be "Walmart," and for another instance, the name may be "Target," as examples. However, it will be appreciated that the level of granularity in the detection and tracking of events can vary. Thus, as an example, the name need not be a tracked variable. Furthermore, other examples of potential tracked variables, or more generally event variables, include arrival time (e.g., a time stamp), arrival location coordinates, driving speed, gas mileage, vehicle name, and many more.

The data acquired by data collection component 215 on aggregate forms a detailed record of patterns of instances of events involving users and venues. These patterns can provide understanding and knowledge to system 200 and can be identified and detected by the various components including event tracker 216, venue visit engine 212, and recommendation engine 260. For example, recommendation engine 260 may employ at least some of these patterns of instances of events (e.g., using usage records) in recommending service content items to users (e.g., associated with user profiles 222).

In accordance with implementations of the present disclosure, at least some of the events utilized by recommendation engine 260 can correspond to a user interaction (e.g., inferred or otherwise detected from interaction data) with a service content item (e.g., one of service content items 218). Examples of user interactions with service content items include a launch of a service content item, an execution of a service content item, a particular use of a service content item or specific portion thereof, an install of a service content item, an interaction with a service content item for a specific purpose, and many more. Typically a user interaction corresponds to at least one explicit user interaction with a service content item (e.g., the user selecting to launch an app, play a song or movie, download a book, or open a document). An event corresponding to a user interaction typically has a corresponding location, referred to as a usage location, as a tracked variable.

Instances of events, such as events corresponding to user interactions, may be stored in association with an event instance record, such as one of usage records 282. As shown with respect to usage record 278, each event instance record can include any combination of a location (e.g., usage location 284), a service content ID (e.g., service content ID 286), and a time stamp (e.g., time stamp 288).

The service content ID corresponds to a respective instance of an event and identifies a specific service content item (e.g., one of service content items 218) associated with the instance of the event. The time stamp corresponds to a respective instance of an event and can indicate the relative order or sequence of the instance of the event with respect to other instances of the event, and optionally instances of one or more other events tracked within system 200. The location corresponds to a respective instance of an event and identifies a geographic area associated with the instance of the event (e.g., where the user interaction and/or usage occurred).

Generally a usage location can comprise any information suitable for system 200 to associate an instance of an event with a designated geographic area, such as those used in geographic tiles that will later be described with respect to FIG. 3. An example of a usage location is a geo-point (e.g., geo-coordinates) that system 200 can determine is within the geographic area. Another example is an identifier of a geographic area or tile. A further example is a venue ID (e.g., associated with one of venue profiles 224) that system 200 can identify within a geographic area or tile. In some implementations, venue visit engine 212 optionally infers a venue visit by a user in association with the user interaction and generates the usage location based on the identified venue (or potentially identified candidate venues).

The location for an event instance record can optionally be based at least partially on one or more spatial samples, such as spatial-temporal samples. A spatial-temporal sample can correspond to data that identifies a specific event, user, and/or device at a location at a time. For example, a spatial-temporal sample can include a geographic location and a time stamp corresponding to the geographic location. Event tracker 216 could use the time stamp as the time stamp of an event instance record or could use it to generate that time stamp (e.g., a mean or median of multiple time stamps). The geographic location may include location coordinates, such as a latitude and longitude, and possibly measurement uncertainty information indicative of the accuracy of the geographic location.

Where spatial-temporal samples are provided by a sensor, such as a GPS receiver, the time stamp may be generated by the sensor, for example, at a time when a location is determined and/or measured by the sensor, along with its GPS coordinates. In some cases, the location data can be extracted from one or more user signals to provide a stream of location data that is aggregated into the location of an event. This can include using cluster analysis of the spatial-temporal samples and may consider other forms of location data and algorithms to arrive at a location for an event instance record.

While a GPS receiver is described, the location data used for determining a usage location can be at least partially extracted by data collection component 215 using any of a variety of approaches for determining a location of a user for an event and optionally a time corresponding to the location. In some implementations, for example, the location data can be generated using a Wi-Fi access point trace and/or a cellular trace. The user may be on user device 102a, which is capable of interacting with signals from the one or more Wi-Fi access points and/or cellular networks. Data collection component 215 may locate the user at least partially based on these interacting signals and generate the location data accordingly, such that event tracker 216 can use the location data to locate the user. As an example, the location data can be based on detecting one or more of those networks and could comprise one or more network names and/or network identifiers corresponding to the networks. Event tracker 216 can use the location data to map the networks to a location corresponding to the user or otherwise utilize information resulting from the interacting signals (e.g., optionally in combination with the spatial-temporal samples).

Thus, in accordance with implementations of the present disclosure, usage locations corresponding to user interactions with service content items are tracked using sensor data provided by one or more sensors, such as GPS and network receivers, on a plurality of user devices, such as mobile devices. The usage locations can be tracked for any number of users and stored in usage records 282. Recommendation engine 260 can aggregate the usage locations of the service content items from the usage records based on crowd-sourced interaction data of many users for the purpose of recommending service content items to users.

Using some approaches to aggregating usage locations, recommendation engine 260 may lack the data points required to reliably provide sufficient recommendations to users. For example, referring to FIG. 3, with FIG. 2, FIG. 3 shows an exemplary geographic region 300 comprising designated geographic areas. It is noted that despite the depiction in FIG. 3, a single geographic tile could correspond to a non-continuous geographic area. Additionally one or more geographic tiles could correspond to the same geographic area or have one or more shared portions thereof. In one approach, event tracker 216 may identify that a user is currently at location 350 using any of the various approaches described above with respect to usage locations, such as by analyzing spatial-temporal data. Recommendation engine 260 may attempt to recommend one or more of service content items 218 to the user based identifying the user at location 350. In doing so, recommendation engine 260 could attempt to discover statistical correlations between location 350 of the user and service content items to recommend service content items that have strong statistical correlations by aggregating usage records 282 proximate to location 350. As one example, the usage records could correspond to usage locations within geographic tile 340A. However, system 200 may not have access to a sufficient quantity of usage records to show a strong statistical correlation to any of service content items 218 or those usage records may be stale or otherwise unreliable. While a larger geographic tile could be used, this would not necessarily increase the number of usage records and could cause the usage records to be less specific to location 350, which can decrease the quality of recommendations.

In accordance with implementations of the present disclosure, recommendation engine 260 constructs virtual tiles (e.g., virtual tiles 214) from multiple geographic tiles (e.g., geographic tiles 225) that have one or more shared semantic characteristics (e.g., semantic characteristics 217). Usage records may be aggregated from each of the geographic tiles of a virtual tile such that strong correlations may be discovered by recommendation engine 260, even where no single geographic tile can support a strong correlation alone. The shared semantic characteristics can serve to effectively link distinct geographic areas in order to improve recommendations of service content items.

Figure 3:
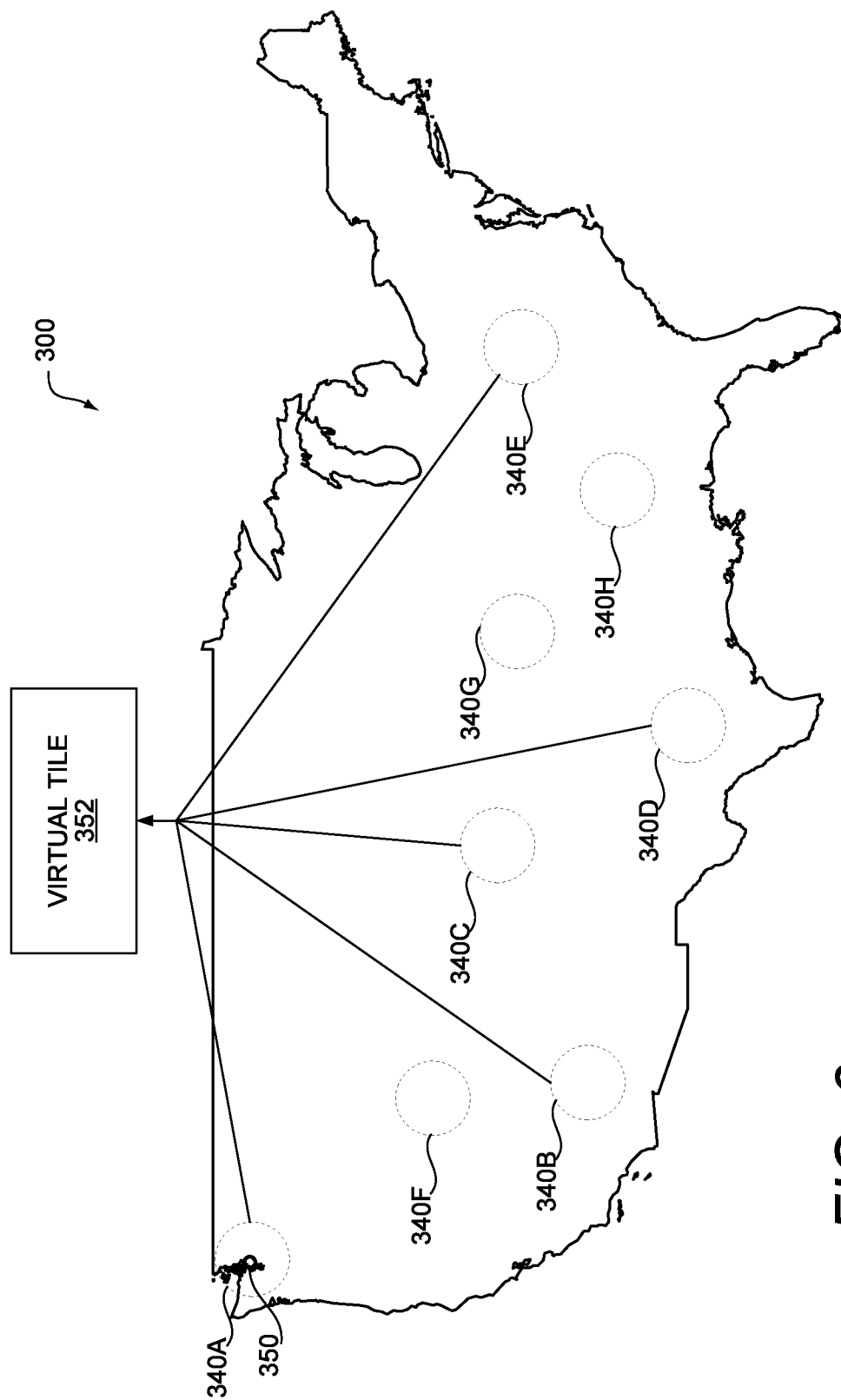
FIG. 3 depicts an exemplary geographic region comprising designated geographic areas in accordance with implementations of the present disclosure.

By way of example, FIG. 3 shows geographic region 300 comprising geographic tiles 340A, 340B, 340C, 340D, 340E, 340F, 340G, and 340H. Each geographic tile represents a designated geographic area, shown within a respective dashed circle in FIG. 3. Recommendation engine 260 may identify geographic tiles that share one or more semantic characteristics for virtual tile 352. For example, in FIG. 3, geographic tiles 340A, 340B, 340C, 340D, 340E may be selected and/or constructed for virtual tile 352 based on each having the one or more shared semantic characteristics. Geographic tiles 340F, 340G, and 340H may not be included in virtual tile 352 by recommendation engine 260 based on the corresponding geographic areas lacking the one or more shared semantic characteristics. However, one or more of those geographic tiles may be utilized for other virtual tiles.

By aggregating usage records corresponding to the geographic tiles of virtual tile 352, recommendation engine 260 can discover strong correlations between service content items and location 350 that geographic tile 340A may not alone be capable of supporting. Additionally, using this approach, each geographic tile can be smaller and more specific to location 350 compared to using a single geographic tile due to increased availability of usage records. For example, if each geographic tile in virtual tile 352 included 1000 relevant usage records, virtual tile 352 would include 5000 usage records, but 3000 usage records might be sufficient, allowing for smaller tiles. Furthermore, geographic tiles can be constructed in such a way that they are more concentrated with usage records and/or more relevant usage records than a larger geographic tile such as by selecting geographic areas with high concentrations of those usage records or using heuristics to select geographic areas that tend to have higher concentrations of those usage logs.

The size, shape, and quantity of geographic tiles for virtual tile 352 in FIG. 3 are merely exemplary. In some implementations, geographic tiles are circular and have a radius of approximately 50 meters or less. However, the shape of a geographic tile need not be critical and different geographic tiles can have different shapes and/or sizes. The size of a geographic area for a geographic tile could optionally be determined based on the resolution of the data, such as usage records available proximate that area or other factors. The size may be adjusted, for example, to decrease the size based on more usage records being available or to increase the size based on usage records being stale. Thus, for example, the size may be based on the density of the usage records and/or the accuracy thereof. Further, size may be based on semantic characteristics of the virtual tile. For example, a geographic tile corresponding to a particular venue or venue category may be smaller than a geographic tile corresponding to a more generalized semantic characteristic. Thus a venue such as a chain store may have a smaller geographic tile, while a venue associated with a nature related characteristic (or other more generalized semantic characteristic), such as a national forest or body of water, may have a larger geographic tile. Also, in some cases, multiple sizes can be utilized for the same geographic tile to expand the geographic area. For example, multiple sizes may be utilized and the size that shows a stronger statistical correlation can be retained. As another example, where one size does not show a sufficient statistical correlation, the size could be expanded until a sufficient statistical correlation is found, or until the size exceeds a predetermined threshold (e.g., radius).

It is further noted that in some implementations, virtual tile 352 need not include geographic tile 340A at all or geographic tile 340A need not include any usage records for recommendation engine 260 to discover strong correlations between location 350 and service content items. In some implementations, recommendation engine 260 need not employ a location (or a specific location) of the user at all. So long as recommendation engine 260 uses suitable semantic characteristics in constructing virtual tile 352, recommendation engine 260 can generate useful recommendations. As an example, location 350 may correspond to a newly opened venue chain with little to no applicable usage records. Using traditional approaches, recommendation engine 260 may be unable to recommend service content items relevant to the newly opened venue chain. By including geographic tiles in a virtual tile based on the same venue chain being located within geographic tiles, service content items can be recommended to the user that are relevant to the venue chain.

As indicated above, one approach to selecting suitable semantic characteristics for virtual tiles in generating recommendations for a user is to match one or more semantic characteristics associated with the user to the geographic tiles. In the example described above, the one or more semantic characteristics are of location 350 associated with the user. However, more generally, the one or more semantic characteristics can be of the location and/or the user. A semantic characteristic of location 350 can be determined and matched to geographic tiles. As indicated above, location 350 could correspond to a venue, a geographic area, a geo-point, or a geographic region associated with the user, and might itself be used as a usage location of a usage record for future recommendations. In some implementations, location 350 is a venue that venue visit engine 212 determines was or is being visited by the user (or determined that the user was near).

Thus, for example, if the utility category of the venue/location is "coffee shop," recommendation engine 260 can match the semantic characteristic to geographic tiles that include a coffee shop and include at least some of them in a virtual tile. Recommendation engine 260 may use the virtual tile to infer that users at or near coffee shops (i.e., in the virtual tile) tend to use a particular app (one of service content items 218) that describes all the types and variations of coffee. This correlation can support a recommendation of the app to a user. As another example, recommendation engine 260 could use the correlation determined from the virtual tile to recommend a song to the user that users tend to listen to at coffee shops, or books that users tend to read at the coffee shops. It should be appreciated that the correlation between the virtual tile and service content items can be one of many factors used to recommend service content items to users.

As further examples, semantic characteristics of a user can be used by recommendation engine 260 to recommend service content items to the user in addition to, or instead of a specific location associated with the user. As an example, a semantic characteristic of the user may indicate that the user likes coffee (e.g., the user liked coffee on Facebook and/or it was inferred by system 200 because the user buys coffee every morning). This semantic characteristic of the user may also be matched to geographic tiles that are known to contain coffee shops to recommend similar content items to the user as described above (e.g., based on the assumption that coffee lovers go to coffee shops and therefore will use service content items relevant to this user who loves coffee). Optionally, recommendation engine 260 might identify usage records in the virtual tile for other users having the semantic characteristic within the geographic tiles as a factor in identifying correlations (e.g., apps that known coffee lovers at or near coffee shops use). By focusing the search for usage records to geographic tiles that tend to include certain types of users (e.g., coffee lovers), significant processing power can be saved and better recommendations can be made in various contexts. Thus, it will be appreciated that location 350 is but one example of a factor in selecting semantic characteristics for geographic tiles. By incorporating location 350 into the example above, recommendation engine 260 could infer such nuanced understandings as needed to recommend service content items that users who love coffee tend to use while at the coffee shop.

Examples of suitable semantic characteristics include routine characteristics of a user and/or location (e.g., a geographic areas or venue). A routine characteristic corresponds to a semantic characteristic that is routine, common place, or regular for the location or user. Routine characteristics may optionally be inferred using event tracker 216 and/or venue visit engine 212 (e.g., this user often eats fast food or users in this location often eat fast food, or it typically rains in this location). A sporadic characteristic can correspond to a characteristic of a location or a user that is irregular, occasional, or isolated for a location or a user.

Whether a characteristic is a routine characteristic or a sporadic characteristic may depend on the perspective, understanding, and knowledge of the system. For example, routine characteristics and sporadic characteristic can both be types of inferred characteristics that are discovered by the system. A routine characteristic can be a characteristic that is determined by the system as being part of a routine that is detected and tracked by the system (e.g., venue visits, visitation patterns, and/or behavior patterns, or routines). A sporadic characteristic can be a characteristic that is determined by the system, but not as being part of a known routine practiced by a location or user that is detected and tracked by the system (e.g., an event that is not part of a known practiced routine vs. an event that may or may not be part of a known practiced routine). In some cases, a sporadic or routine characteristic may be inferred from multiple characteristics, which can include at least one routine characteristic or sporadic characteristic.

Some examples of routine characteristics of a user include user preferences, such as cuisine preferences, brand preferences, movie preferences, music preferences, parental status (i.e., whether the user is a parent), demographic information (e.g., age, gender, marital status, the user being engaged to be married, the user being married, the user being single, literacy/education, employment status, occupation, residence location), routinely visited venues (e.g., user hubs), and many more. Examples of sporadic characteristics of a user include the user being sick, the user craving fast food, the user being late for work, the user diverging from or contradicting an expected tracked routine, the user being on vacation, specific personal events of the user, such as a wedding, and many more.

Examples of routine characteristics of a location (e.g., a venue) include a type, utility, or merchant category (e.g., restaurant, retail, coffee shop, gym, movie theater, entertainment, work, office, etc.), a particular venue chain category, such as a Starbucks®, or a Walmart®, cuisine served in the location, operating hours of a venue corresponding to the location, peak visit times to the location, aggregate receipt totals for visitors at a location, regular sales or other events at a location (e.g., annual sales), aggregate visitor demographics, aggregate visitor characteristics, and many more. Examples of sporadic characteristics include a specific concert occurring on a particular day or at a particular time at a location, an unexpected spike in visitors to a location and/or visitors or traffic (e.g., people or vehicles) near a location, current weather conditions at a location, unusual events or activity occurring at a location, and many more.

These and other semantic characteristics can be used for users and/or locations (e.g., venues or geographic areas) in constructing and selecting geographic tiles. As further examples, a semantic characteristic of a geographic tile and/or virtual tile could specify nearby venues, venue chains, and/or venue categories. As another example, a semantic characteristic could specify one or more geographic characteristics, such as climate, altitude, ocean, sea shore, lake, forest, desert, etc. Other examples include highway, road, village, or city center. It should be appreciated that any combination of these semantic characteristics can be employed (e.g., road in the desert, or coffee shop in the desert). In some cases, geographic tiles and/or virtual tiles are pre-generated, stored in storage 220. The stored data can be reused for multiple recommendations, for constructing virtual tiles from other virtual tiles, and/or for selecting from the geographic tiles for inclusion in various virtual tiles. For example, one geographic tile could be used for multiple virtual tiles (e.g., in a virtual tile corresponding to coffee shops in Seattle, to coffee shops in America, to kid-friendly places, to vegan-friendly places, to organic-friendly places, or GMO-free places, and many more). Also, multiple virtual tiles could be used for one virtual tile depending on the semantic characteristics being selected for by recommendation engine 260 (e.g., a virtual tile corresponding to coffee shops in major cities could include a virtual tile corresponding to coffee shops in Seattle).

Geographic tiles and/or virtual tiles may be stored in association with semantic characteristics, such a semantic characteristics 217 (e.g., as semantic characteristic values). A geographic tile may have many associated semantic characteristics that are determined and stored in association with that tile. Further, a geographic tile may be selected for one virtual tile based on one of the stored semantic characteristics and for another virtual tile based on another of the semantic characteristics. The stored geographic tiles and/or virtual tiles can be changed over time by system 200 for many reasons, such as based on semantic characteristics being updated, geographic areas being modified, new geographic tiles and usage records being added to the system, and usage records becoming stale. It will be appreciated that at least some geographic tiles and/or virtual tiles can be constructed on an as needed basis and need not be persistently stored.

In some implementations, geographic tiles are generated based on venue profiles 224. In doing so, recommendation engine 260 may leverage that knowledge, including known semantics of venues used by venue visit engine 212 to identify venue visits, in constructing geographic tiles corresponding to those semantics. For example, venue profiles 224 can store venue IDs, venue names, venue categories, venue locations, and various other semantic characteristics of particular venues. Thus, for example, recommendation engine 260 could construct a geographic tile that includes at least one coffee shop based on identifying one or more venue profiles that include a coffee shop or have a venue name that includes coffee, a synonym, or a related word or words. In some implementations, one or more geographic tiles are generated by selecting a venue location and generating a geographic area for a geographic tile based on the venue location. For example, a geographic area could correspond to a 50 meter radius (or other predetermined range) around a particular venue.

Having constructed a virtual tile from geographic tiles, recommendation engine 260 uses correlation analyzer 221 to determine correlations between the virtual tile (e.g., the geographic areas of the virtual tile) and one or more of service content items 218. Correlations 223 may be captured by determining one or more features for each service content item and combining those features into a combined model. For example, various features could be included in a machine learning model or other model for matching service content items to virtual tiles.

At least one feature may correspond to a calculated statistical correlation between a service content item and a virtual tile based on usage records (e.g., usage locations) of the virtual tile. As an example, a feature could correspond to a calculated probability (e.g., a probability score) that the relevant usage records for a particular service content item were observed in the virtual tile by chance. Recommendation engine 260 can aggregate the usage records or usage records that satisfy one or more criteria for this determination. The calculated probability can be based on one or more of the aggregated usage records of the virtual tile for a particular service content item (Nav) compared to aggregated usage records for any geographic area in system 200

(e.g., any geographic tile and/or region) (Na), the aggregated usage records of the virtual tile for any service content item in the virtual tile (Nv), and the aggregated usage records of a reference population (N*), such as in the United States, or other geographic region or regions, or the entire system.

In addition, or instead, at least one feature may correspond to a calculated statistical correlation based on a Pearson Correlation between the virtual tile and a particular service content item. For example, the Pearson Correlation can utilize an aggregated usage vector (Vu) generated for the virtual tile that includes an entry for each geographic tile in a selected geographic region (e.g., the United States, another geographic region or regions, or the entire system) where each entry represents usage records of a particular geographic tile (e.g., the total usage records in the tile) if the geographic tile is within the virtual tile, otherwise the entry could be '0' (e.g., Vu={50, 80, 0, 0, 0, 0, . . . , 75, 0}). The Pearson Correlation may further utilize an aggregated semantic characteristic vector (Vc) generated for the virtual tile where each entry corresponds to the same geographic tile as the aggregated usage vector, but the value of the entry represents the magnitude of the semantic characteristic of the geographic tile. For example, a '0' could indicate that the geographic tile does not have the semantic characteristic. A geographic tile having two Starbucks might have an entry of '2' and a geographic tile having one Starbucks might have an entry of '1' if "includes a venue chain named Starbucks" is used as a semantic characteristic. Thus, in the example above, a suitable vector used with Vu could be Vc={1, 2, 0, 0, 0, 0, . . . , 1, 0}. The calculated statistical correlation can therefore be between usage of the service content item (or a specified type of usage) and the virtual tile.

Other features include text-based measurements of the correlation between service content items and the virtual tile. This can be based on, for example, comparing any of various metadata associated with a semantic content item to the virtual tile, such as semantic characteristics of the virtual tile and/or metadata of the virtual tile. Examples of metadata associated with a service content item include a description of the service content item, a name of the service content item, a category of the service content item, images of the service content item, and many more. Service content items that are available in stores typically include such information for apps, songs, books, videos, and the like to organize the service content items and inform users of their contents.

Recommendation engine 260 can determine correlations between virtual tiles and service content items and use the correlations to recommend service content items to users. For example, in some cases, all else being equal, service content items having stronger correlations to a virtual tile are more likely to be recommended to a user than those with weaker correlations. In recommending service content items, one option is to feed any of the various features described above into a model, such as a classifier, to determine which service content items are representative of the virtual tile. One or more of these service content items may be recommended to the user. Various threshold may be employed, such as to recommend a service content item based on a statistical correlation corresponding to the service content item exceeding a threshold value. Further, in some implementations, the system may indicate to the user why the service content items where represented (e.g., based on the one or more semantic characteristics of the virtual tile). As an example, a Starbucks application could be recommended along with text that reads "This application is popular at Starbucks." It is further noted that in some cases, the correlations determined by recommendation engine 260 are but one component of a larger and more complex service content item recommendation algorithm implemented using recommendation engine 260, which can consider other relevant information that provides more contextually relevant service content item recommendations.

In additional aspects of the present disclosure, the correlations of the virtual tiles and service content items can be used to infer semantic characteristics of user locations. As an example, one or more semantic characteristics of virtual tile 352 can be inferred for location 350 and/or the user based on the user performing a user interaction with a service content item that has a sufficient statistical correlation with virtual tile 352. In doing so, the inferred semantic characteristics can be used by venue visit engine 212 as a factor in inferring whether the user has visited a particular venue. Venue visit engine 212, might be more confident that the user visited a Starbucks where virtual tile 352 corresponds to geographic areas that contain Starbucks and the user opened a Starbucks application that shows a strong correlation to virtual tile 352. Venue visit engine 212 can use this as one factor in determining which particular venue the user has visited or is visiting. For example, this information could be a factor for venue visit engine 212 in selecting the proper visited venue from multiple candidate venues (e.g., a Coffee Shop, A Pizza Parlor, and a Movie Theater). Service content items may be recommended to the user based on determining that the user is or was at the particular venue.

In some implementations, venue visit engine 212 generates a set of candidate venues based on proximity between location 350 (e.g., a geo-location) of the user and the candidate venues. The candidate venues may be selected from the venues corresponding to venue profiles 224 based on the proximity. In some implementations, venue visit engine 212 selects each venue located within a given radius or region of the user location as a candidate venue. The radius used can be determined based upon the accuracy of the location data, such that venue visit engine 212 uses a larger radius or region for less accurate location data. The accuracy of the location data may be determined, for example, based on the source or sources of the data and/or from the location data itself (e.g., based on values thereof). For example, venue visit engine 212 may employ a smaller radius for location data extracted from or using a GPS receiver than for location data based on network tracing absent data from a GPS receiver.

Additionally, one or more venues may be included in the set of candidate venues by using one or more other approaches to candidate venue identification. For example, such a candidate venue may not necessarily have a venue profile in venue profiles 224 associated with a specific location, but instead may be more generic or categorical. Examples include a private residence, a beach, a park, a freeway, or an office, although other types of venue categories can be employed. These venues may be referred to herein as categorical venues and are distinguished from specific venues.

Venue visit engine 212 can use semantic information to infer which of the candidate venues is visited by the user (e.g., based on confidence scores for each candidate venue). For example, the inference can be based upon any combination of semantic characteristics of one or more users, venues, geographic tiles, and/or virtual tiles, such as of the user and the candidate venues. Prior and/or subsequent venue visits can be used, for example, by venue visit engine 212, to attempt to map the venue visit being analyzed to a routine of the user. Where venue visit engine 212 is able to map the venue visit to the routine, it is more likely that a venue visit has occurred.

Further, venue visit engine 212 may use the statistical correlations between service content items and virtual tiles to attempt to map the venue visit being analyzed to a virtual tile. In particular, the statistical correlations can be used to infer semantic characteristics associated with the user (e.g., of the user or the location of the user). As an example, there may be a correlation between virtual tile 352 and a Starbucks app (e.g., user's may often open the app when visiting Starbucks), such that the user opening the Starbucks app during a venue visit can be mapped to a virtual tile comprising geographic tiles that each correspond to a Starbucks venue. Where the candidate venues being considered by venue visit engine 212 include a particular Starbucks venue (i.e., a venue in that category), venue visit engine 212 can have an increased confidence that the user visited that venue. When one of the candidate venues is selected as a visited venue, recommendation engine 260 may be employed to recommend service content items to the user based, at least partially on the selection of the visited venue.

Recommendation engine 260 can employ content item selector 219 to select recommended service content items from service content items 218. Recommended service content items for a user can be presented, for example, on any combination of user devices 102a through 102n. In this capacity, presentation component 298 can receive service content item recommendations from recommendation engine 260 and employ any of the various data shown with respect to user profiles 222 and venue profiles 224, as well as other data. Presentation component 298 can determine when and/or how recommended service content items are presented to a user. Presentation component 298 optionally requests service content item recommendations (and may provide one or more selection criteria for recommendations) or recommendations can be pushed to presentation component 298. In some embodiments, presentation component 298 comprises one or more applications or services operating on a computing device (such as computing device 700 described in FIG. 7 including a user device, such as a mobile computing device) or in the cloud.

Determinations made by presentation component 298 with respect to presenting service content items can be utilized to assist the user, such as by requesting recommendations and providing service content items to the user based on the service content items being relevant to a visited venue, or refraining from providing one or more recommended service content items to the user in certain contexts thereby reducing the utilization of network resources. For example, a user may be presented with a song typically played by users at gyms when the user is at a gym as opposed to when the user is at home. As another example, the user may be presented with a recommended song to play while driving, but not a recommended book to read.

Recommendations may be presented to the user by presentation component 298 based on a specific request for recommendations from the user and/or a user device associated with the user, or may not be specifically requested. For example, in some cases, a user may request recommended service content items while browsing an app store application. As another example, recommendations could be pushed to a user device and presented actively or passively on the user device, such as based on detecting a particular venue visit by the user.

In some cases, determinations made by presentation component 298 with respect to presenting service content items are based on contextual information. In some implementations, venue visit engine 212 and/or event tracker 216 may generate the contextual information, which may be provided to presentation component 298. Contextual information generally corresponds to information that provides context to the presentation of service content items. Contextual information can be generated utilizing interpretive data to infer or otherwise determine the contextual information, at least partially, from user data associated with the user (e.g., semantic characteristics).

Further, the contextual information may be inferred from venue data associated with a visited venue (e.g., venue characteristics). For example, contextual information could indicate that a user is out of town if the user is located in a different country than their residence. Other interpretive data could be used to further distinguish whether the user is on a personal vacation or is on a business trip. Venue visit engine 212 may also generate contextual information utilizing interpretive data to infer or determine the contextual information, at least partially, from user data associated with at least one other user, such as crowd-sourced data. Contextual information can comprise any type of semantic information corresponding to the user and/or a visited venue or user location. Examples include the time of day, whether it is a weekend, weekday, or holiday, weather conditions, and many more.

Contextual information may indicate or otherwise correspond to a cause of or reason for a venue visit. In some cases, generating the contextual information comprises categorizing the venue visit. In particular, venue visit engine 212 may assign one or more predetermined categories to the venue visit. The content that is provided can be tailored to the category that is assigned to the venue visit, and may be inferred from one or more semantic characteristics of a virtual tile. An assigned category can correspond to a categorization of a cause of or reason for the venue visit. The assignment may optionally be based on an analysis of the user data (e.g., aggregated user data and/or user data corresponding to the user) and/or interpretive data. Examples of predetermined categories for the nature of the venue visit include running errands, leisure activities, working, eating out, exercising, getting coffee, or shopping.

Where the venue visit is part of a tracked routine identified for the venue visit, such a category may additionally or instead correspond to a categorization for the overall routine. This can be useful, for example, where presentation component 298 is operating in a prediction mode where content is provided to the user based on the visited venue being used to detect and/or identify a routine of the user. The content that is provided can be tailored to the category that is assigned to the routine. Thus, presentation component 298 may provide differing content to the user based on whether the user is running errands, participating in leisure activities, driving to work, or exercising. As another example, presentation component 298 can provide content based on the category for a future instance of a routine. In a particular example, presentation component 298 may infer that the user typically goes to the gym on Saturdays and offer recommendations for songs correlated with the gym on a Thursday.

Other examples of contextual information are confidence scores, variance scores, and other information generated in identifying and selecting a venue visit and/or recommended service content item. A further example is an online or offline mode indicator for a venue visit. An offline mode indicates a state in which venue visit engine 212 has determined that the venue was visited in the past. In contrast, online mode corresponds to a state in which venue visit engine 212 has determined that the user is presently visiting the venue and/or is actively participating in an instance of a tracked routine that includes the visit to the venue. As an example, a fitness tracker app may be presented to the user in online mode, whereas the fitness tracker app may not be presented to the user in offline mode. The manner and type of content provided by presentation component 298 may depend on the mode.

In some cases, presentation component 298 may provide content to a user based on an identification and/or selection of a venue visit, an identified tracked routine corresponding to the venue visit, and/or contextual information corresponding to the venue visit. For example, if contextual information indicates that the user is on vacation in Scotland, the service content items provided to the user may be specific to tourists, such as information about the country, leisure activities available in the area, and the like. This content would not be presented, for example, if the contextual information indicated the user was not on vacation. Where contextual information comprises one or more categories, at least some of the content provided to the user may be associated (e.g., pre-associated) with a category assigned to a venue visit. Thus, different categories may have at least some different associated service content items for presentation, and the service content items presented to the user may depend upon which category or categories have been assigned to the venue visit. Presentation component 298 may communicate at least some of this contextual information to recommendation engine 260 as criteria for recommending service content items.

In some implementations, recommendation engine 260 selects or generates one or more recommended actions for presentation component 298 in the presenting of the service content items to the user. A recommended action corresponds to data that presentation component 298 can utilize in determining various aspects of the presenting of content to the user. A recommended action may specify or designate one or more service content items, one or more static and/or dynamic content fields (e.g., in a service content item card), one or more service content item cards, a time, a place or location, a screen or menu, an environment, a mode or manner of user interaction, or other factors that may be incorporated into conditions or instructions with respect to an action. Presentation component 298 may choose or select to follow one or more conditions and/or instructions associated with or corresponding to a recommended action for presenting a service content item to the user.

As examples, a recommended action may indicate to presentation component 298 (or another application or service), and/or be utilized by presentation component 298 to determine, any combination of when to present a service content item to a user (e.g., using a specified time or time range); how to present a service content item to the user; what service content item to present to the user; when to present a service content item to the user; when to refrain from presenting a service content item to the user; when to seek user feedback with respect to a service content item; and many more.

In some embodiments, recommended actions may correspond to one or more conditions, which may be assessed based on sensor(s) on a user device associated with the user, via user history, patterns or routines (e.g., the user drives to work every day between 8:00 and 8:30 AM), other user information (such as online activity of a user, user communication information including missed communications, urgency or staleness of the service content item (e.g., the service content item should be presented to the user in the morning but is no longer relevant after 10 AM), the particular user routine that a venue visit is a part of, and/or contextual information corresponding to a venue visit. For example, where the user is likely driving a car between 8:00 and 8:30 AM, a service content item recommended to be presented to the user during this time may be audibly presented to the user while the user is driving. As another example, a service content item regarding a suggestion to use an offer at a visited venue may be presented where the user opens an application associated with that venue (e.g., while the user is visiting the venue). The service content item may be presented as a pop-up notification, highlighted message, an icon or symbol in a notifications menu, a text, email, other communication or similar means.

Where a recommended action is with respect to one or more service content item cards, the recommended action may specify one or more service content item cards. For example, a recommended action may be to present one or more service content item cards to the user, refrain from presenting one or more service content item cards to a user, or when to present one or more service content item cards to the user.

In some cases, recommendation engine 260 generates one or more recommended actions based on the generated contextual information. For example, a recommended action may be based on a categorization of a venue visit and/or routine corresponding to the venue visit. Thus, one recommended action may be selected or generated by venue visit engine 212 based on the venue visit being assigned a user-specific category, and another recommended action may be selected or generated by venue visit engine 212 based on the venue visit being assigned a user-general category. As another example, at least one recommended action may be generated based on a confidence score utilized in identifying a venue visit. For example, a recommended action may be selected or generated based on the confidence score exceeding or not exceeding a threshold value.

As described above, in some implementations, presentation component 298 can follow one or more recommended actions provided by recommendation engine 260 in presenting its recommended service content items. In some cases, presentation component 298 may determine whether to follow one or more of the recommended actions. As an example, a recommended action could be to request information from the user. Presentation component 298 may request the information from the user based on the recommended action. Presentation component 298, or another application, or service running on a user device, may determine, or select, to follow one or more recommended actions and may determine or select to ignore, or not follow, one or more other recommended actions. For example, one or more recommended actions may be ignored, or not followed, based on one or more criteria, such as, the presentation component already having access to information, determining that the user is away from the device or is unlikely to respond to a recommended action, determining that the recommended action no longer applies or is no longer relevant, presentation component 298 having another suitable, or preferred action, and/or other determinations, or inferences, which are based on user data (e.g., user device data), venue data, and/or interpretive data.

Furthermore, in some implementations, presentation component 298 may select to modify one or more recommended actions and to follow one or more of the modified recommended actions. In addition, or instead, presentation component 298 may select or generate one or more actions for presenting recommended service content items to the user without regard to a recommended action. These actions and recommended actions may be determined in similar or different manners from one another, and may consider similar information.

In some cases, instances of presentation component 298 are incorporated into one or more services (e.g., applications, processes, programs, threads, etc.), which may be running on a user device, and/or a different system than any combination of the various constituents of system 200. As an example, one or more services may receive any combination of information generated and/or stored by system 200, which may be incorporated into event or routine tracking data. Examples include one or more confidence scores, contextual information, semantic information, semantic characteristics of virtual tiles, recommended actions, tracked variables, variance scores, and more. A service could be running on a user device and may receive such information from a server. As another example, the service could be running on a server in a different system than servers providing such information. As a further example, the information could be received from one or more other services running on the same device (e.g., a user device) as the service. For example, one or more of the various components of FIG. 2 could be incorporated into the same device, which in some cases may be beneficial for security, privacy, and/or other reasons.

In some cases, some to all of the information may be pushed to the service from a server, for example, based on a subscription to the information. As another option, some to all of the information could be queried for by the service. As an example, the information could be stored in one or more entries in storage 220. The service, such as an application, may query that information for use by presentation component 298.

Thus, it will be appreciated that, in some cases, recommendations made by recommendation engine 260 and/or other constituents of system 200 may be provided to applications or services as a cloud service. In this regard, applications on user devices may optionally incorporate an application programming interface (API) for communicating with the cloud service and for providing at least some functionality of presentation component 298. In this way, a common framework may be provided to applications for tailoring service content items to users.

Referring now to FIG. 4, a flow diagram is provided showing an embodiment of a method 400 for recommending service content items based on virtual tiles. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, method 400 includes constructing a virtual tile. For example, recommendation engine 260 can construct virtual tiles 214 from geographic tiles 225 based on identifying one or more shared semantic characteristics 217 amongst the geographic tiles. Each geographic tile 215 corresponds to a designated geographic area where the one or more shared semantic characteristics 217 are of the geographic area of the geographic tile. As noted above, virtual tiles and/or geographic tiles can be constructed by recommendation engine 260 on an as needed basis or can be constructed from pre-constructed virtual tiles and/or geographic tiles.

At block 420, method 400 includes receiving usage records of service content items. For example, recommendation engine 260 can receive usage records 282 of service content items. Usage records 282 are generated (e.g., by data collection component 215) from sensor data provided by one or more sensors of a plurality of mobile devices within a geographic region that includes the geographic tiles. For example, the sensor data may be from user devices 102a through 102n in geographic region 300 of FIG. 3. Each of usage records 282 can identify a service content item (e.g., via service content ID 286) of service content items 218, and include a usage location (e.g., usage location 284) corresponding to a user interaction with the service content item. As noted above, each usage record may further comprise a time stamp, such as time stamp 288 corresponding to the user interaction.

At block 430, method 400 includes calculating a correlation between a service content item and the virtual tile based on the usage records. For example, correlation analyzer 221 of recommendation engine 260 can calculate a statistical correlation between each of service content items 218 and virtual tiles 214 based on an aggregation of usage records 282. The aggregation can be based on identifying ones of usage records 282 that have a usage location for the service content item within a geographic tile of a virtual tile. For example, the aggregation can be utilized to determine various features of correlations, such as probability scores or Pearson Correlations.

At block 440, method 400 includes providing a recommendation of service content items. For example, recommendation engine 260 may recommend one or more of service content items 218, or other service content items, based on the correlation.

Referring now to FIG. 5, a flow diagram is provided showing one embodiment of a method 500 for recommending service content items based on virtual tiles. At block 510, method 500 includes identifying a location of a user. For example, recommendation engine 260 may identify location 350 of a user based on sensor data provided by one or more sensors of user device 102a. Location 350 could correspond to a visited venue and/or candidate venue identified by venue visit engine 212. In addition, or instead, location 350 could correspond to one of geographic tiles 225. Furthermore, location 350 could correspond to one or more spatial-temporal samples from user device 102a.

At block 520, method 500 includes determining a semantic characteristic of the location. For example, based on location 350 corresponding to one of geographic tiles 225, recommendation engine 260 could determine the semantic characteristic based on one of semantic characteristics 217 associated with the geographic tile. In addition, or instead, based on location 350 corresponding to an identified venue, the semantic characteristic could be based on one or more semantic characteristics of the venue.

At block 530, method 500 includes matching the semantic characteristic of the location to a semantic characteristic of a virtual tile. For example, recommendation engine 260 can select or construct one of virtual tiles 214 that has geographic tiles corresponding to the semantic characteristic. As one example, virtual tile 352 may be employed based on geographic tiles 340A, 340B, 340C, 340D, and 340E corresponding to designated geographic areas that have the semantic characteristic.

At block 540, method 500 includes calculating a correlation between a service content item and the virtual tile based on the usage records. For example, correlation analyzer 221 of recommendation engine 260 can calculate a statistical correlation between each of service content items 218 and virtual tiles 214 based on an aggregation of usage records 282. The aggregation can be based on identifying ones of usage records 282 that have a usage location for the service content item within a geographic tile of a virtual tile. For example, the aggregation can be utilized to determine various features of correlations, such as probability scores or Pearson Correlations.

At block 550, method 500 includes providing a recommendation of service content items. For example, recommendation engine 260 may recommend one or more of service content items 218, or other service content items, based on the correlation. As one example, the recommendation may be provided on user device 102*a* while the user is visiting a particular venue based on venue visit engine 212 detecting the venue visit.

Figure 6:
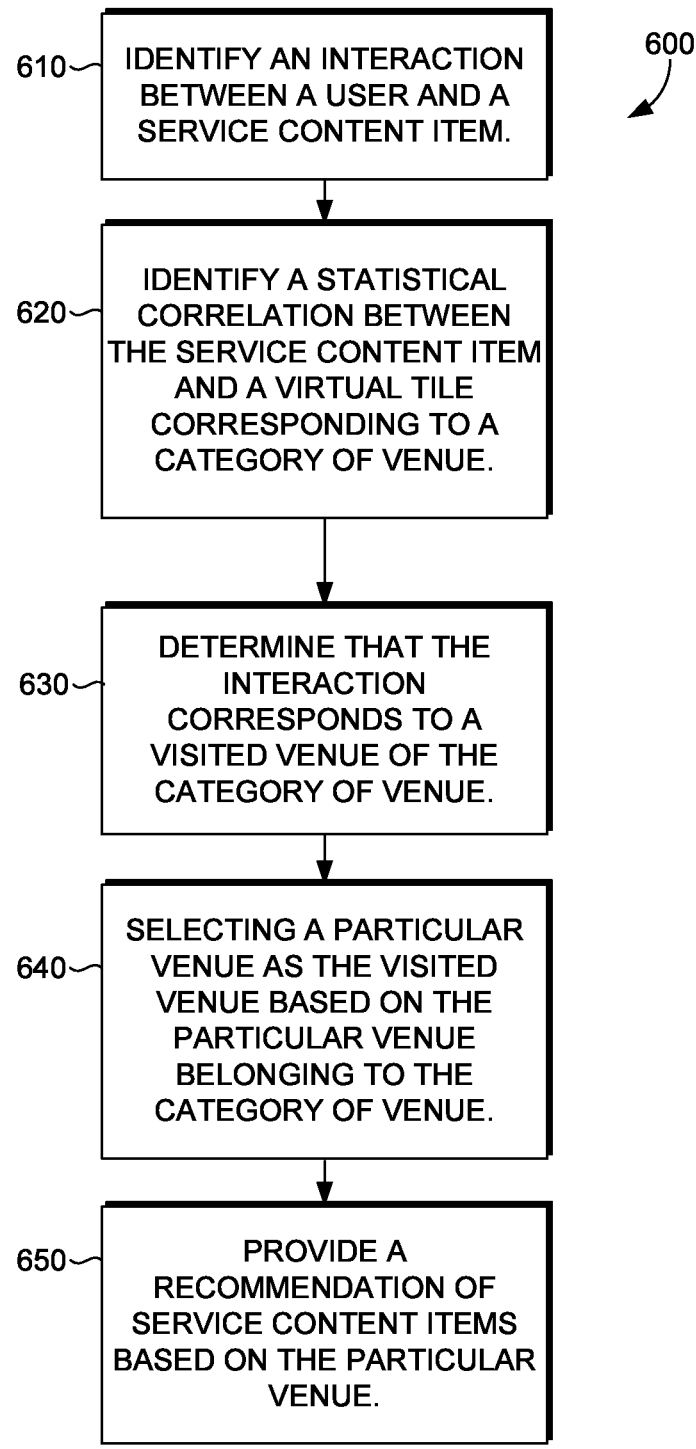
FIG. 6 is a flow diagram showing a method for recommending service content items to users based on virtual tiles in accordance with implementations of the present disclosure.

Referring now to FIG. 6, a flow diagram is provided showing one embodiment of a method 500 for recommending service content items based on virtual tiles. At block 610, method 600 includes identifying an interaction between a user and a service content item. For example, while a user is at location 350, event tracker 216 may identify that the user launched an app or performed some other user interaction with a service content item. Based on the interaction, event tracker 216 may optionally generate a usage record using location 350 as the usage location, and an ID of the app as the service content ID.

At block 620, method 600 includes identifying a statistical correlation between the service content item and a virtual tile corresponding to a category of venue. For example, recommendation engine 260 may identify a statistical correlation between the service content item and virtual tile 352. The statistical correlation could be pre-calculated, or calculated as needed. In some cases, the statistical correlation is with respect to the same usage event detected in block 610. For example, the statistical correlation could be for launches of the app. However, interactions can be more generalized, such as any type of interaction or category of interaction. In the present example, virtual tile 352 corresponds to a category of venue. In particular, each geographic tile is included in virtual tile 352 based on at least one venue within the category of venue being identified for the geographic area of the geographic tile.

At block 630, method 600 includes determining that the interaction corresponds to a visited venue of the category of venue. For example, recommendation engine 260 may make the determination based on the statistical correlation. In some cases, where the statistical correlation exceeds a threshold value, recommendation engine 260 may make the determination.

At block 640, method 600 includes selecting a particular venue as the visited venue based on the particular venue belonging to the category of venue. For example, venue visit engine 212 can utilize the category of venue as a factor in selecting a visited venue. In some cases, the visited venue is selected from a group of candidate venues, at least partially based on determination of block 630.

At block 650, method 600 includes providing a recommendation of service content items. For example, recommendation engine 260 may recommend one or more of service content items 218, or other service content items, based on the particular venue being selected as a visited venue. As one example, the recommendation may be provided on user device 102*a* while the user is visiting the particular venue based on venue visit engine 212 detecting the venue visit.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, implementations of the present disclosure provide for recommending service content items using virtual tiles. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Accordingly, in one aspect, an embodiment of the present disclosure is directed to a computerized method. The method comprises (a) identifying a location of a user based on sensor data provided by one or more sensors of a user device, (b) determining one or more semantic characteristics of the location of the user, (c) matching the one or more semantic characteristics of the location of the user to one or more semantic characteristics of a virtual tile comprising geographic tiles, each geographic tile corresponding to a designated geographic area, the one or more shared semantic characteristics being of the geographic area of the geographic tile, (d) receiving usage records of service content items, the usage records generated from sensor data provided by one or more sensors of a plurality of mobile devices within a geographic region that includes the geographic tiles, each usage record identifying a service content item of the service content items, and comprising a usage location corresponding to a user interaction with the service content item, (e) calculating a statistical correlation between at least one of the service content items and the virtual tile based on an aggregation of the usage records, the aggregation being based on identifying ones usage records that have the usage location of the at least one of the service content items within the geographic tiles of the virtual tile, and (f) providing a recommendation of one of more service content items to the user based on the calculated statistical correlation.

In another aspect, an embodiment of the present disclosure is directed to a computerized system comprising a content recommendation engine comprising one or more processors, and one or more computer storage media storing computer-useable instructions that, when executed by the one or more processors, cause the one or more processors to perform operations. The operations include (a) constructing a virtual tile comprising geographic tiles based on identifying one or more shared semantic characteristics amongst the geographic tiles, each geographic tile corresponding to a designated geographic area, the one or more shared semantic characteristics being of the geographic area of the geographic tile, (b) receiving usage records of service content items, the usage records generated from sensor data provided by one or more sensors of a plurality of mobile devices within a geographic region that includes the geographic tiles, each usage record identifying a service content item of the service content items, and comprising a usage location corresponding to a user interaction with the service content item, (c) calculating a statistical correlation between at least one of the service content items and the virtual tile based on an aggregation of the usage records, the aggregation being based on identifying ones of the usage records that have the usage location of the at least one of the service content items within the geographic tiles of the virtual tile, and (d) providing a recommendation of one of more service content items to a user based on the calculated statistical correlation.

In yet another aspect, an embodiment of the disclosure is directed to one or more computer storage devices storing computer-useable instructions that, when used by one or more computing devices, cause the one or more computing devices to perform a method. The method comprises (a) identifying an interaction between a user and a service content item, (b) identifying a statistical correlation between the service content item and a virtual tile, the statistical correlation based on an aggregation of usage records, the aggregation being based on identifying ones of the usage records that have a usage location of the service content item within geographic tiles of the virtual tile, each geographic tile corresponding to a designated geographic area and comprising at least one venue of a designated category of venue within the geographic area of the geographic tile, (c) based on the identifying of the statistical correlation, determining that the interaction corresponds to a visited venue of the category of venue, (d) selecting a particular venue as the visited venue based on determining that the particular venue belongs to the category of venue, and (e) providing a recommendation of one of more service content items to the user based on the selecting of the particular venue as the visited venue.

In an additional aspect, a virtual tile created according to a process is provided. The process includes (a) selecting one or more semantic characteristics for the virtual tile, (b) identifying geographic tiles for the virtual tile that each have the one or more shared semantic characteristics, each geographic tile corresponding to a designated geographic area, the one or more semantic characteristics being of the geographic area of the geographic tile, and (c) incorporating at least some of the identified geographic tiles into the virtual tile.

What is claimed is:

1. A computerized method comprising:
identifying a location of a user based on sensor data provided by one or more sensors of a user device;
determining semantic characteristics of the location of the user;
after the identifying of the location, matching the semantic characteristics of the location of the user to semantic characteristics of a virtual tile comprising geographic tiles, each geographic tile respectively representing a geographic area and being included in the virtual tile based on exhibiting a respective instance of the one or more semantic characteristics of the virtual tile in the geographic area of the geographic tile;
receiving usage records of service content items, the usage records generated from sensor data provided by one or more sensors of a plurality of mobile devices within the geographic tiles, each usage record corresponding to a respective geographic tile and identifying a service content item of the service content items based on usage of the service content item in the geographic tile, and comprising a usage location corresponding to a user interaction in the geographic tile associated with the usage of the service content item;
calculating a statistical correlation between at least one of the service content items and the virtual tile based on an aggregation of the usage records based on the matching, the aggregation being based on identifying ones of the received usage records that have the usage location of the at least one of the service content items within the geographic tiles of the virtual tile that each exhibit the respective instance of the one or more semantic characteristics of the virtual tile; and
providing a recommendation of one of more service content items to the user based on the calculated statistical correlation.

2. The method of claim 1, wherein the identifying the location of the user comprises identifying a venue visited by the user and the one or more semantic characteristics correspond to a category of the venue.

3. The method of claim 1, wherein the one or more semantic characteristics correspond to at least one venue of a category of venue being located within the designated geographic area for each of the geographic tiles.

4. The method of claim 1, wherein each of the service content items is an application (app) and the user interaction corresponds to a launch of the app.

5. The method of claim 1, wherein the calculated statistical correlation is between usage of the at least one of the service content items and the virtual tile.

6. The method of claim 1, wherein the calculated statistical correlation represents a probability the aggregation of the usage records were observed in the virtual tile by chance.

7. The method of claim 1, wherein the matching is further of one or more semantic characteristics of the user to the one or more semantic characteristics of the virtual tile.

8. The method of claim 1, wherein the location is outside of the virtual tile.

9. The method of claim 1, wherein the matching the one or more semantic characteristics of the location of the user to one or more semantic characteristics of the virtual tile comprises identifying a plurality of pre-constructed geographic tiles for the virtual tile based on the pre-constructed geographic tiles having semantic characteristic values corresponding to the one or more semantic characteristics of the location.

10. A computerized system comprising:
a content recommendation engine comprising one or more processors; and
one or more computer storage media storing computer-useable instructions that, when executed by the one or more processors, cause the one or more processors to perform operations comprising:
constructing a virtual tile comprising geographic tiles based on identifying one or more semantic characteristics shared amongst the geographic tiles, each geographic tile respectively representing a geographic area and being included in the virtual tile based on exhibiting a respective instance of the one or more semantic characteristics in the geographic area of the geographic tile;
receiving usage records of service content items, the usage records generated from sensor data provided by one or more sensors of a plurality of mobile devices within the geographic tiles, each usage record corresponding to a respective geographic tile and identifying a service content item of the service content items based on usage of the service content item in the geographic tile, and comprising a usage location corresponding to a user interaction in the geographic tile associated with the usage of the service content item;
calculating a statistical correlation between at least one of the service content items and the virtual tile based on an aggregation of the usage records based on the matching, the aggregation being based on identifying ones of the received usage records that have the usage location of the at least one of the service content items within the geographic tiles of the virtual tile that each exhibit the respective instance of the one or more semantic characteristics; and
providing a recommendation of one of more service content items to a user based on the calculated statistical correlation.

11. The system of claim 10, wherein the constructing the virtual tile comprises:

identifying venue profiles corresponding to venues of a particular category of venue, the venue profiles comprising locations of the venues; and generating one of the geographic tiles of the virtual tile for each of the venues based on the locations of the venues, wherein the particular category of venue is one of the one or more shared semantic characteristics.

12. The system of claim 10, wherein the one or more shared semantic characteristics correspond to at least one venue of a particular venue chain being located within the designated geographic area for each of the geographic tiles.

13. The system of claim 10, comprising:
determining that a venue visited by the user is in a particular category of venue;
including the at least one of the service content items in the recommendation provided to the user based on the particular category of venue matching the one or more shared semantic characteristics amongst the geographic tiles and based on the calculated statistical correlation.

14. The system of claim 10, comprising:
tracking instances of one or more events of the user, the events being of a routine tracked by the system;
determining that the user practices the routine based on the tracked instances of the one or more events;
inferring a routine characteristic of the user based on the determining that the user practices the routine;
including the at least one of the service content items in the recommendation provided to the user based on the routine characteristic of the user matching the one or more shared semantic characteristics amongst the geographic tiles and based on the calculated statistical correlation.

15. The system of claim 10, wherein the calculated statistical correlation represents a probability the aggregation of the usage records were observed in the virtual tile by chance.

16. The system of claim 10, wherein the calculated semantic characteristic is one of a plurality of features of a classifier trained to identify service content items that are representative of the virtual tile.

17. The system of claim 10, wherein the providing the recommendation of the one of more service content items to the user is further based on a usage record associated with the user, the usage record corresponding to the at least one of the service content items.

18. One or more computer-readable storage media hardware comprising instructions that are stored thereon that, responsive to execution by one or more computing devices, cause the one or more computing devices to perform operations comprising:
identifying a location of a user based on sensor data provided by one or more sensors of a user device;
determining semantic characteristics of the location of the user;
after the identifying of the location, matching the semantic characteristics of the location of the user to one or more semantic characteristics of a virtual tile comprising geographic tiles, each geographic tile respectively representing a geographic area and being included in the virtual tile based on exhibiting a respective instance of the one or more semantic characteristics of the virtual tile in the geographic area of the geographic tile;
receiving usage records of service content items, the usage records generated from sensor data provided by one or more sensors of a plurality of mobile devices within the geographic tiles, each usage record corresponding to a respective geographic tile and identifying a service content item of the service content items based on usage of the service content item in the geographic tile, and comprising a usage location corresponding to a user interaction in the geographic tile associated with the usage of the service content item;
calculating a statistical correlation between at least one of the service content items and the virtual tile based on an aggregation of the usage records based on the matching, the aggregation being based on identifying ones of the received usage records that have the usage location of the at least one of the service content items within the geographic tiles of the virtual tile that each exhibit the respective instance of the one or more semantic characteristics of the virtual tile; and
providing a recommendation of one of more service content items to the user based on the calculated statistical correlation.

19. The one or more computer-readable storage media hardware of claim 18, wherein the identifying the location of the user comprises identifying a venue visited by the user and the one or more semantic characteristics correspond to a category of the venue.

20. The one or more computer-readable storage media hardware of claim 18, wherein the one or more semantic characteristics correspond to at least one venue of a category of venue being located within the designated geographic area for each of the geographic tiles.

* * * * *